W. K. JONES.

INFANT'S APPAREL.

APPLICATION FILED MAR. 17, 1917.

Reissued Oct. 30, 1917. 14,389.

WITNESSES

INVENTOR
W. K. Jones

BY

ATTORNEYS

UNITED STATES PATENT OFFICE.

WILLIAM KETCHUM JONES, OF WICHITA, KANSAS.

INFANT'S APPAREL.

14,389. Specification of Reissued Letters Patent. Reissued Oct. 30, 1917.

Original No. 1,195,682, dated August 22, 1916, Serial No. 38,734, filed July 8, 1915. Application for reissue filed March 17, 1917. Serial No. 155,586.

*To all whom it may concern:*

Be it known that I, WILLIAM K. JONES, a citizen of the United States, residing at Wichita, in the county of Sedgwick and State of Kansas, have invented certain new and useful Improvements in Infants' Apparel, of which the following is a full, clear, and exact description.

This invention relates to certain improvements in infants' apparel; and it is an object of the invention to provide a novel and improved means whereby shoulder suspension may be afforded to a nether garment.

Furthermore, it is an object of the invention to provide a novel and improved device of this general character especially designed and adapted for use in connection with young infants and affording a means whereby proper warmth may be afforded to the trunk of the body.

The invention consists in the details of construction and in the combination and arrangement of the several parts of my improved infants' apparel whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1:
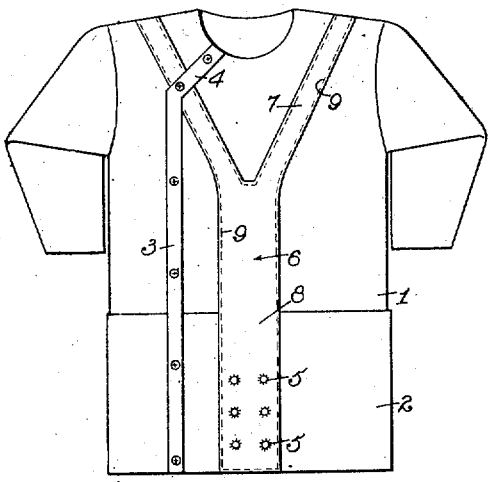
Figure 1 is a view in front elevation of one embodiment of my invention as herein set forth.
Figure 2:
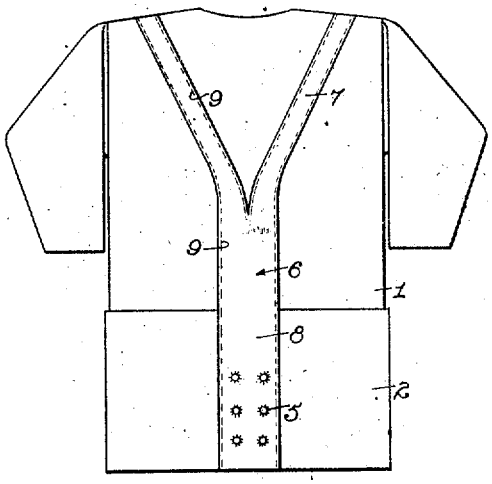
Fig. 2 is a rear elevational view of my invention as disclosed in Fig. 1.
Figure 3:
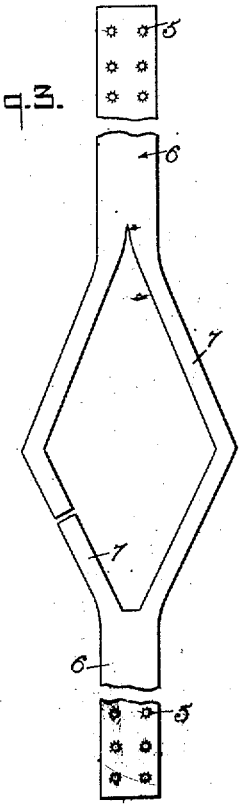
Fig. 3 is a plan view of the reinforcing member as herein embodied.

As disclosed in Figs. 1 to 3, 1 denotes a body garment of a type generally worn by young infants and having its skirt portion 2 returned to afford a double thickness so as to assure maintaining the abdomen and back of the infant warm. It is expressly understood that the returned or double thickness skirt portion 2 forms no essential part of my invention. The garment as disclosed in these figures is of a coat type with the major portion of the opening 3 to one side of the neck of the garment and with the upper extremity 4 of said opening inclined toward the neck and in communication therewith. I also find it of advantage to provide the skirt of the garment both in the front and in the rear with the vertically disposed pairs of openings 5 through which the attaching member of a safety pin or the like may be passed so that the nether garments may be properly supported with a possibility of injury to the body garment substantially entirely eliminated, and by having the openings arranged in vertically disposed pairs it will be perceived that an adjustable connection between the nether garments and the body garment may be effected as best meets the requirements of practice.

In order to relieve the neck of the wearer from strain, incident to the weight of the nether garment, I find it particularly advantageous to provide the garment 1 with the strips 6, the intermediate portion of which being longitudinally divided, as at 7, so that the strip may be disposed over the shoulders of the garment at opposite sides of the neck with the opposite extremities 8 of the strip lying against the front and back of the skirt in alinement with the neck portion thereof.

In view of the foregoing, it is thought to be evident that the durability and length of wear of an under garment constructed in accordance with an embodiment of my invention is greatly prolonged and that the reinforcing strips serve to place the pull or strain of the garment on the shoulders.

From the foregoing description it is thought to be obvious that infants' apparel constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

The openings 5 are reinforced to prevent the garment from tearing.